Sept. 26, 1933.   R. H. FRIED   1,928,126
MEAT SUPPORT
Filed April 15, 1931
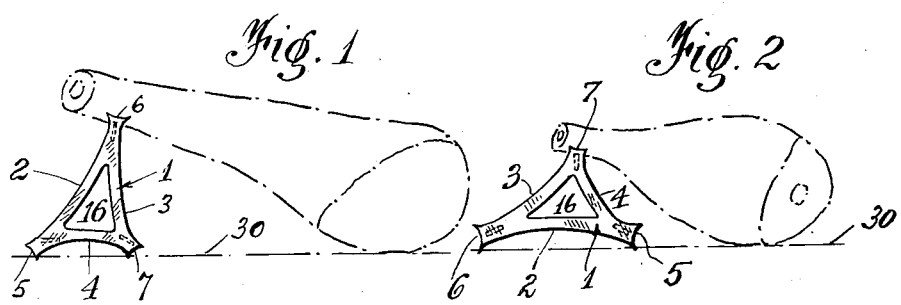
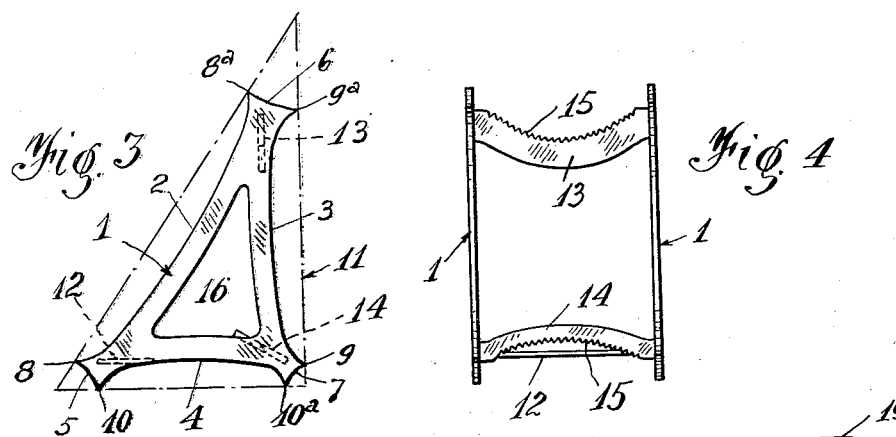
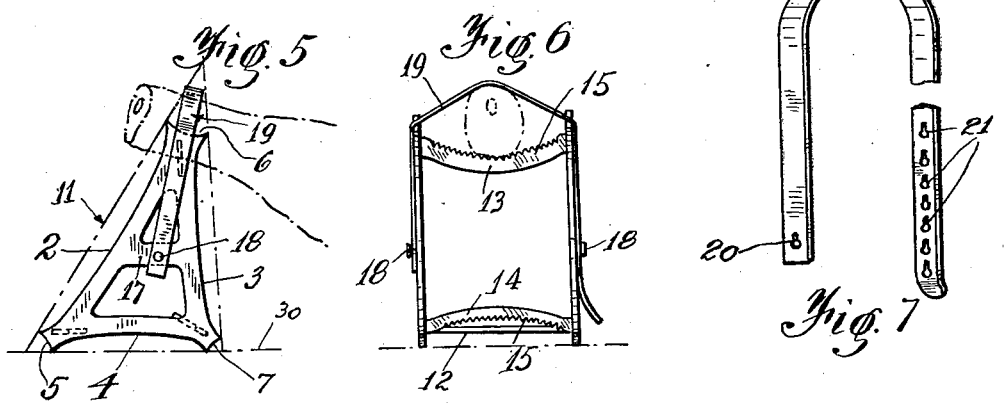
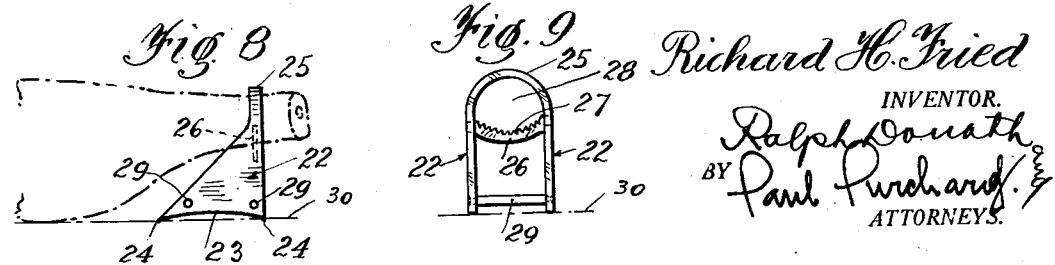
Richard H. Fried
INVENTOR.
BY Ralph Donath
Paul Purchard
ATTORNEYS.

Patented Sept. 26, 1933

1,928,126

UNITED STATES PATENT OFFICE 1,928,126

MEAT SUPPORT

Richard H. Fried, Pittsburgh, Pa.

Application April 15, 1931. Serial No. 530,272

2 Claims. (Cl. 17—44)

This invention relates to supports, and more in particular to portable supports for use in butcher shops, slaughter houses, etc.

The primary object of this invention is to provide a support adapted to hold the shank-end of a leg of beef or a ham in the best cutting position and to prevent said shank-end from shifting about during the cutting operation.

Another object of this invention is to provide a support of this character adapted to accommodate various sizes of legs or hams and to hold their shank-ends at a suitable height above the meat cutting block.

Yet another object is to provide such a support having adjustable means for the securement of the shank-end supported thereby.

Still another object of this invention is the provision of such a support which is of very simple construction, light in weight and which can be manufactured at relatively low cost.

Additional features and advantages of this invention will appear in the course of the following description considered in connection with the accompanying drawing forming part of this application and in which:

Fig. 1 is a side elevation showing the use of the support in connection with a large piece of meat, such as the leg of beef, shown in dot-and-dash lines.

Fig. 2 shows the same support inverted to hold a relatively small leg, such as a ham, also shown in dot and dash lines.

Fig. 3 is a side elevation of the support.

Fig. 4 is an end view of Fig. 3.

Fig. 5 shows a side elevation of a modified support provided with an additional holding means for the shank-end of a leg.

Fig. 6 is an end view of Fig. 5.

Fig. 7 is a perspective view of one of several holding means usable in connection with the modified support shown in Figs. 5 and 6.

Fig. 8 is another modification of the support intended for use exclusively on hams.

Fig. 9 is an end view of Fig. 8.

Reference being had to the drawing, a support built according to Figs. 1 to 4 comprises two similar and substantially triangular end frames 1 each having three concave sides 2, 3 and 4 connected at their truncated corners by short concave sides 5, 6 and 7 producing the sharp bearing edges 8, 8ª, 9, 9ª and 10, 10ª adapted to engage the top of a wooden meat cutting bench or block 30 and to partly dig themselves into it to prevent shifting of the support while meat is being cut. As shown in Fig. 3, these edges are circumscribed by the sides of an imaginary triangle 11, preferably right-angled.

These end frames are rigidly connected together, preferably in parallel relation, by the flat cross-bars 12, 13 and 14 of rectangular cross-section which are positioned adjacent the apexes of the frame and disposed substantially at right angles to their respective opposite sides of the circumscribed triangle 11. These cross-bars are outwardly concave and are preferably provided with serrations 15 to support and hold against shifting therein the shank-end of a leg or ham.

The reason for making the cross-bars normal to their respective opposite sides of the circumscribed triangle 11 is that each of said bars will assume a substantially vertical operative position, regardless of which side of the support is set on the meat cutting block. This position of the cross-bar is the most favorable to properly hold the shank-end of a leg either at the right- or left-hand sides of said support.

To reduce the weight of the support the center portion of each side frame may be apertured, as shown at 16, Figs. 1 and 3.

The modification shown in Figs. 5 to 7 differs from the one above described, in that each side frame is provided with a transverse bar 17 having a centrally positioned stud or button 18 to which may be attached any desired flexible clamping means, such as a chain, a metal-strap or the belt 19 by means of which shank-ends of various sizes may be clamped tightly on either one of the cross-bars 12, 13 or 14. In the drawing, the use of a belt is suggested, and the latter is provided at one end with a single aperture 20 adapted to be engaged by one of the studs 18, while at the other end is provided a series of longitudinally spaced apertures 21, adapted to engage the other stud.

The support shown in Figs. 8 and 9 is intended for use only in connection with pork-hams and to be left thereon until said ham is disposed of. Being limited to this single use, the support may be made considerably smaller than the above described supports and it need not be removed from the ham, when the latter is hung on a meat hook, etc.

This ham-support consists of two end-plates 22, having substantially the form of a right-angled triangle, the base-side 23 of which is concaved and provided at the corners with sharp edges 24 adapted to partly penetrate into the meat block or bench upon which the ham is cut. The top ends of the side-plates are connected together by a substantially semicircular bail 25, below which is placed, at a suitable distance, the outwardly concave cross-bar 26, which may also be provided, if desired, with serrations 27.

The shank end of the ham is inserted in the opening 28 between the bail and the cross-bar.

The side plates are additionally secured in spaced relation, usually parallel, by means of the crossties 29 placed near the base-side 23.

As will be understood, as suggested herein, there may be slight changes made in the construction and arrangement of the details of my invention without departing from the field and scope of the same, and I intend to include all such variations, as fall within the scope of the appended claims, in this application in which the preferred forms only of my invention are disclosed.

I claim:

1. In a device for supporting legs of beef, hams, and the like on a meat cutting block, a pair of end-frames of substantially triangular shape having outwardly concave sides; cross-bars of rectangular cross-section for securing said frames in spaced relation and severally adapted to support on their narrow sides one end of said legs or hams, and sharp protruding portions positioned at the ends of said sides and adapted to penetrate partly in said block; said sharp portions being jointly disposed in circumscribed relation to an imaginary triangle, and each cross-bar being normally disposed to its respective opposite side of said triangle.

2. In a device for supporting legs of beef, hams and the like on a meat cutting block, a pair of end-frames of substantially triangular shape; cross-bars of rectangular cross-section for securing said frames in spaced relation and severally adapted to support on their narrow sides one end of said legs or hams; each cross-bar being outwardly concave and serrated and disposed substantially normally to the respective opposite sides of said frames.

RICHARD H. FRIED.